(12) United States Patent
Remington

(10) Patent No.: US 8,631,603 B2
(45) Date of Patent: Jan. 21, 2014

(54) FISHING TRIGGER DEVICE

(76) Inventor: Don Remington, Valley Center, CA (US)

( * ) Notice: Subject to any disclaimer, the term of this patent is extended or adjusted under 35 U.S.C. 154(b) by 338 days.

(21) Appl. No.: 13/037,564

(22) Filed: Mar. 1, 2011

(65) Prior Publication Data

US 2011/0219661 A1 Sep. 15, 2011

Related U.S. Application Data

(60) Provisional application No. 61/312,980, filed on Mar. 11, 2011.

(51) Int. Cl.
*A01K 85/01* (2006.01)

(52) U.S. Cl.
USPC .................................................. 43/17; 43/16

(58) Field of Classification Search
USPC .......................................................... 43/17, 16
See application file for complete search history.

(56) References Cited

U.S. PATENT DOCUMENTS

| | | | | |
|---|---|---|---|---|
| 2,921,399 | A | * | 1/1960 | Huliew .............................. 43/17 |
| 3,371,443 | A | * | 3/1968 | Dobson ............................. 43/17 |
| 3,629,966 | A | | 12/1971 | Sanchez |
| 3,813,806 | A | | 6/1974 | Nishi |
| 4,038,772 | A | | 8/1977 | Mihaly |
| 4,146,988 | A | | 4/1979 | Bednarczyk |
| 4,202,126 | A | | 5/1980 | Pietrenka |
| 4,236,340 | A | | 12/1980 | Cunningham |
| 4,633,608 | A | | 1/1987 | Savarino |
| 4,693,125 | A | | 9/1987 | Krutz |
| 4,702,031 | A | | 10/1987 | Sousa |
| 4,746,253 | A | * | 5/1988 | Simmons .......................... 43/17 |
| 4,750,286 | A | | 6/1988 | Gray |
| 4,908,973 | A | * | 3/1990 | Perks ................................. 43/17 |
| 5,058,308 | A | * | 10/1991 | Girard ............................... 43/17 |
| 5,063,373 | A | * | 11/1991 | Lindsley .................... 340/573.2 |
| 5,125,181 | A | | 6/1992 | Brinton |
| 5,239,769 | A | | 8/1993 | Anderson |
| 5,570,532 | A | * | 11/1996 | Shaffer et al. ..................... 43/17 |
| 5,678,347 | A | | 10/1997 | Cube |
| 5,918,407 | A | | 7/1999 | Sebestyen |
| 5,986,552 | A | * | 11/1999 | Lyons ........................ 340/573.2 |
| 6,035,573 | A | | 3/2000 | Flores |
| 6,094,852 | A | * | 8/2000 | Roach ............................... 43/16 |
| 6,101,757 | A | * | 8/2000 | Draghici ........................... 43/17 |
| 6,421,948 | B1 | | 7/2002 | Craig |
| 6,836,994 | B1 | | 1/2005 | Fulper |
| 7,043,867 | B1 | | 5/2006 | Fox |
| 2002/0112392 | A1 | * | 8/2002 | Heath ................................ 43/17 |
| 2004/0079023 | A1 | | 4/2004 | Johnson |
| 2006/0230666 | A1 | | 10/2006 | Moffitt |
| 2008/0022577 | A1 | | 1/2008 | Duggins |
| 2008/0066367 | A1 | | 3/2008 | Meeks |
| 2010/0269397 | A1 | | 10/2010 | Hale |

* cited by examiner

*Primary Examiner* — Christopher P Ellis

(57) ABSTRACT

A fishing trigger device alerts the fisherman of a fish bite and at the same time releases the fishing line to offer sufficient slack line for the fish to swallow the bait. The fishing trigger device includes a holder adapted to be inserted into a ground, the holder including a one piece device including a container and a pointed end and a trigger supported by the container, the trigger adapted to secure a fishing line prior to a fish bite, the trigger adapted to release the fishing line after the fish bite.

7 Claims, 2 Drawing Sheets

FISHING TRIGGER DEVICE

CROSS-REFERENCE TO RELATED APPLICATIONS

This application claims the benefit of priority to U.S. Provisional Application No. 61/312,980 filed Mar. 11, 2011, the contents of which are incorporated herein by reference.

BACKGROUND OF THE INVENTION

The present invention generally relates to a trigger device that detects when a fish strikes a baited line. More particularly, the present invention relates to a device that is triggered by tension in a fishing line and then provides slack line for hooking the fish.

Fishing is a very popular sport. However, fishing often requires a lot of patience and fishermen do not like to constantly hold their fishing when fish bites, rod and reel assemblies. It is common for fishermen to use a pole holder including signaling devices to detect a fish bite. The signaling devices are activated by the tension created in the fishing line caused by the fish bite. Currently, the existing signaling devices retain the fishing line when they are activated, which does not provide enough slack in the fishing line to hook the fish.

As can be seen, there is a need for a fishing trigger device that alerts the fisherman of a fish bite and at the same time releases the fishing line to offer sufficient slack line for the fish to swallow the bait.

SUMMARY OF THE INVENTION

In one aspect of the present invention, a fishing trigger device includes a holder adapted to be inserted into a ground, the holder including a one piece device including a container and a pointed end and a trigger supported by the container, the trigger adapted to secure a fishing line prior to a fish bite, the trigger adapted to release the fishing line after the fish bite.

In another aspect of the present invention, a fishing trigger device includes a holder adapted to be inserted into a ground, a trigger supported by the holder, wherein the trigger includes a bend adapted to secure a fishing line prior to a fish bite, the fishing line is released from the bend after the fish bite.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provides a fishing trigger device that alerts the fisherman of a fish bite and, at the same time, releases the fishing line to offer sufficient slack line for the fish to swallow the bait.

Figure 2:
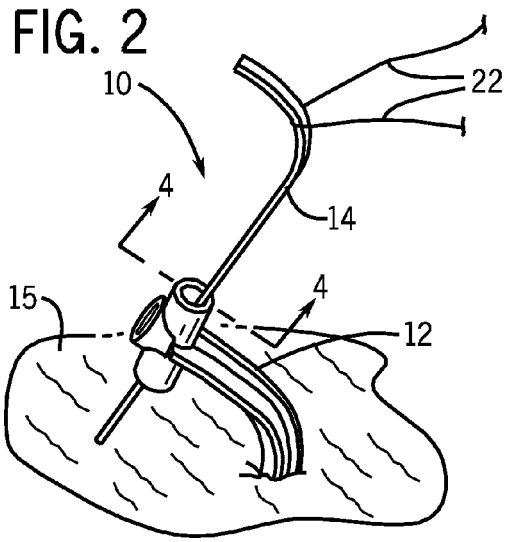
FIG. 2 illustrates a perspective front view of the fishing trigger device of FIG. 1.
Figure 3:
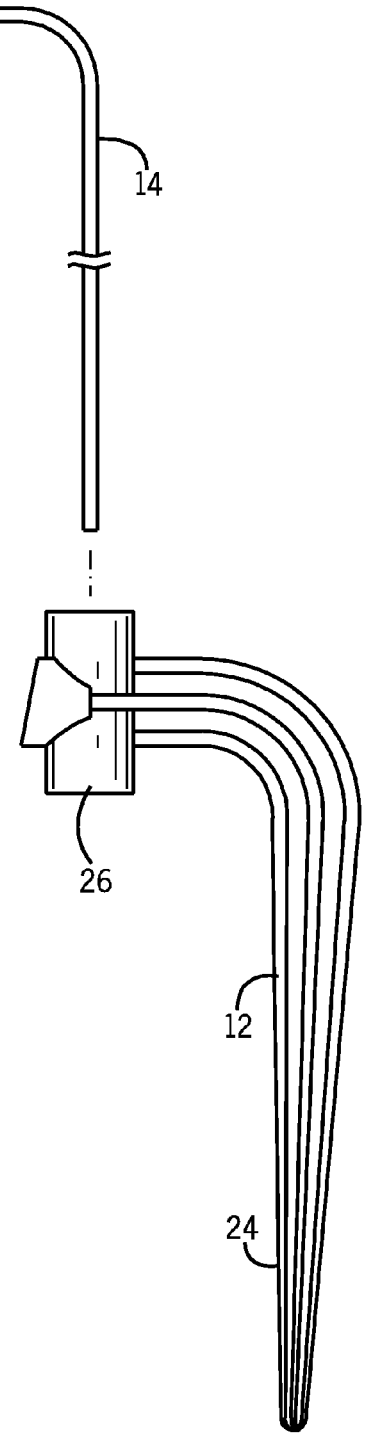
FIG. 3 illustrates an exploded view of the fishing trigger device of FIG. 2.
Figure 4:
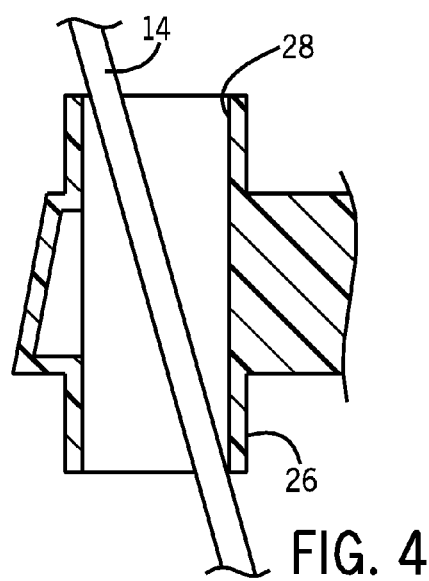
FIG. 4 illustrates a cross-sectional view taken along line 4-4 of FIG. 2.

FIGS. 2-4 illustrate a fishing trigger device 10 according to an exemplary embodiment of the present invention. The fishing trigger device 10 may include a holder 12 adapted to be inserted into the ground 15 and a trigger 14 inserted in the holder and adapted to be connected to a fishing line 22. The holder 12 may support the trigger 14 in a vertical position.

The ground 15 may include any structure suitable to support the holder 12. In some embodiments, the ground 15 may be sand or dirt. In other embodiments, the ground 15 may be a rocky shoreline, where the holder 12 may be inserted between rocks, for example.

The holder 12 may be a one piece device including a container 26 having an opening 28 to support the trigger 14 and a pointed end 24 adapted to be inserted into the ground 15. The holder 12 may include a bend between the container 26 and the pointed end 24. In some embodiments, the bend may be placed between 3 and 4 inches from the pointed end 24. In some embodiments, the bend may be placed approximately at 2 inches from the container 26. In some embodiments, the bend may be a 90 Degree angle. In some embodiments, the bend may be a curve. The holder 12 may be made of a sturdy material. In some embodiments, the holder 12 may be made of plastic, non-corrosive metal, polymer, composite, or wood. The holder 12 may be made in different sizes. In some embodiments, the length of the holder 12 may be between 2 and 24 inches.

The pointed end 24 may be inserted into the ground 15. In some embodiments, the pointed end 24 may be inserted into the ground 15 until the bend reaches the ground 15. In some embodiments, the pointed end 24 may be inserted into the ground from approximately 3 to 4 inches deep in a vertical position.

The trigger 14 may be inserted through the opening 28 of the container 26 and then rest on the ground 15. The trigger 14 may be a one piece elongated device including a bend. The trigger 14 may be made of a sturdy material. In some embodiments, the trigger 14 may be made of plastic, non-corrosive metal, polymer, composite, or wood. The trigger 14 may be made in different sizes. In some embodiments, the length of the trigger 14 may be between 2 and 12 inches. The trigger 14 may have different widths and thicknesses. In some embodiments, the width of the trigger 14 may be ⅛ inch and the thickness may be 1/16 inch. The trigger 14 may be made of many different colors. In some embodiments, the trigger 14 may be made of fluorescent colors.

Figure 1:
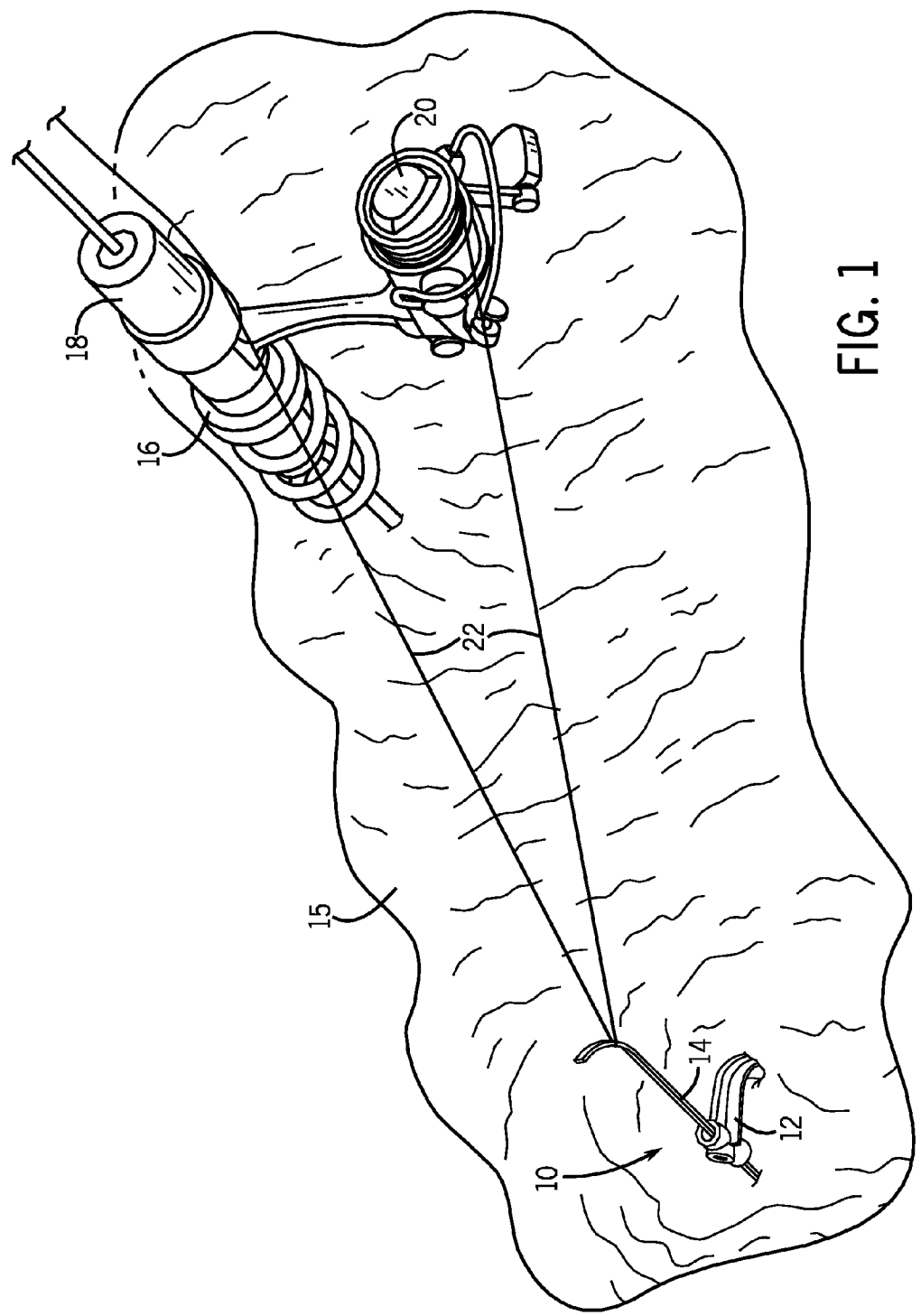
FIG. 1 illustrates a perspective front view of a fishing trigger device according to an exemplary embodiment of the present invention showing the fishing trigger device in use.

FIG. 1 illustrates the fishing trigger device 10 in use. A fishing pole 18 may be mounted in a pole holder 16. The trigger 14 may be configured and designed to hold taut the fishing line 22 from the reel 20 with the reel bail in an open position.

The fisherman may place the fishing trigger device 10 at a distance from the reel 20 in a direction opposite to the reel handle to prevent the line from catching on the reel handle. In some embodiments, the fishing trigger device 10 may be placed at approximately one foot from the reel 20. Then, the fisherman may insert the pointed end 24 in a vertical position into the ground 15. The trigger 14 may be inserted through the opening 28 of the container 26 and then rest on the ground 15. After casting out the bait, the fisherman may place the fishing pole 18 on the pole holder 16 and leave the reel bail in the open position. Then, the fisherman may pull the fishing line 22 from the reel 20 to the bend of the trigger 14. When a fish strikes, the trigger 14 may be lifted out from the holder 12, which may release the fishing line 22 from the reel 20 as fast as the fish swims away with the bait. Then, the fisherman may pick up the fishing pole 18, flip the bail closed, and set the hook when desired.

In some embodiments, the holder 12 may be optional and the trigger 14 may be inserted directly into the ground 15. Not too deep, enough to hold trigger 14 in an upright position.

A small hole (not shown) may be drilled into the holder 12 and the trigger 14 to pass a small piece of string to secure both pieces together.

It should be understood, of course, that the foregoing relates to exemplary embodiments of the invention and that modifications may be made without departing from the spirit and scope of the invention as set forth in the following claims.

What is claimed is:

1. A fishing trigger device comprising:
 a holder adapted to be inserted into a ground, the holder including a one piece device including a container and a pointed end, wherein the container has an opening; and
 a trigger supported by the container, the trigger adapted to secure a fishing line prior to a fish bite, the trigger adapted to release the fishing line after the fish bite.

2. The fishing trigger device according to claim 1, wherein the holder includes a bend between the container and the pointed end.

3. The fishing trigger device according to claim 2, wherein the bend is a curve.

4. The fishing trigger device according to claim 1, wherein the trigger is inserted through the opening of the container and then resting on the ground.

5. The fishing trigger device according to claim 1, wherein the trigger is a one piece elongated device including a bend.

6. The fishing trigger device according to claim 5, wherein the fishing line is held by the bend of the trigger.

7. The fishing trigger device according to claim 1, wherein the trigger is made of a fluorescent material.

* * * * *